United States Patent Office 2,746,943
Patented May 22, 1956

2,746,943
POLYMER COMPOSITIONS AND METHODS FOR PRODUCING THE SAME

James E. Pritchard, Bartlesville, Okla., assignor to Phillips Petroleum Company, a corporation of Delaware No Drawing. Application November 9, 1951,
Serial No. 255,741

9 Claims. (Cl. 260—29.6)

This invention relates to new polymer compositions. In one of its more specific aspects this invention relates to the use of a salt of a pyridine derivative containing at least one vinyl group as an emulsifying agent. In another of its more specific aspects this invention relates to a homogeneous polymer composition prepared from an ethylenically unsaturated polymerizable organic compound capable of forming a high molecular weight linear polymer and a derivative of pyridine containing at least one vinyl group.

Polymers prepared by conventional emulsion polymerization processes generally contain residues from the emulsifying agents which are employed. These residues comprise fatty acids and rosin acids in instances when fatty acid and rosin acid soaps are the emulsifying agents but with other types of emulsifying agents, different types of residues, which are non-resinous or non-polymeric in character, result. The final product is not a totally resinous material but contains various emulsifier residues which may have deleterious effects upon the polymeric product for many uses to which it may be applied. In the production of molded articles, for example, the presence of non-resinous contaminants often produces a cloudiness or off-color effect upon otherwise clear materials and in some instances may decrease their strength or otherwise affect them deleteriously. In general when it is desired to prepare a composition containing at least two polymeric materials, each of the materials is prepared separately and the final composition is then produced by a suitable blending of the separate ingredients.

By at least one of its aspects, one or more of the following objects of this invention will be obtained.

An object of this invention is to provide a method for the preparation of new polymer compositions. Another object of the invention is to provide new polymer compositions. A further object of this invention is to provide a method for the production of new polymer compositions which will readily take dyes. A still further object of this invention is the use of a salt of a polymer of a pyridine derivative containing at least one vinyl group as an emulsifying agent for ethylenically unsaturated polymerizable compounds. A still further object of this invention is to provide a method of polymerization in which the pyridine derivative containing at least one vinyl group forms, with the polymerized monomer, a homogeneous polymeric composition. Further objects of this invention will be apparent to one skilled in the art.

I have now discovered an emulsion polymerization process whereby new polymeric compositions, free from non-resinous emulsifier residues, are obtained. The process comprises effecting the polymerization of selected monomers or comonomers in an acid medium the presence of an emulsifying agent comprising a salt of a polymer of a pyridine derivative containing at least one vinyl group. At the conclusion of the polymerization, coagulation is effected by the addition of an alkaline material which neutralizes the emulsifying agent and converts it to a resin which is compatible with the polymer and forms therewith a homogeneous, totally polymeric product. Polymer compositions of the type herein described are prepared directly, thus eliminating the blending step which must be used in conventional processes.

The emulsifying agents employed in this invention are salts prepared from a polymer of a pyridine derivative containing at least one vinyl group by treatment with a suitable acid. The polymers are prepared by means well known in the art. One convenient method is to polymerize the monomer in aqueous emulsion in the presence of soap flakes, potassium persulfate, and a mercaptan. This polymerization process is similar to that known as the GR–S process except that a pyridine derivative containing at least one vinyl group is employed as a monomeric material instead of butadiene-styrene comonomers. The potassium persulfate acts as an initiator, and other peroxy compounds such as hydrogen peroxide, urea peroxide, or benzoyl peroxide may be substituted therefor. The function of the mercaptan is to act as a modifier to control the length of the polymer chain. At the conclusion of the polymerization, coagulation is accomplished by adding sufficient acid, such as sulfuric or hydrochloric acid, to give a viscous aqueous solution of polymer and then adding a base, such as an alkali metal hydroxide, to precipitate the resin. Sufficient base is added to convert the fatty acid to a soap which is removed by several washings. In order to insure complete removal of soap, the resin is generally dissolved in a suitable solvent, such as isopropyl alcohol and reprecipitated in water. The polymers utilized in the present invention should have a molecular weight of at least 500.

Compounds used for the preparation of the polymers are the mono- and divinylpyridines, with the vinyl groups being present in any of the several positions in the pyridine nucleus. Alkyl groups can be present on the ring or on the α carbon of the vinyl group, but the number of carbon atoms in the combined alkyl groups should generally not be greater than 12. These alkyl groups are preferably methyl and ethyl groups. These compounds have the structural formula

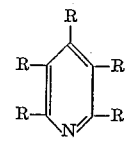

where R is selected from the group consisting of hydrogen, alkyl, vinyl, and alpha-methylvinyl groups; at least one and not more than two of said groups being vinyl or alpha-methylvinyl; and the total number of carbon atoms in the alkyl groups being not greater than 12. Examples of such compounds are 2-vinylpyridine; 2,5-divinylpyridine; 2-methyl-5-vinylpyridine; 2,3,4-trimethyl - 5 - vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl - 3 - vinylpyridine; 3 - dodecyl - 4,5 - divinylpyridine; 2,4-dimethyl-5,6-dipenthyl-3 - vinylpyridine; 2 - decyl - 5(α-methylvinyl) pyridine; 3,5-di(α-methylvinyl)pyridine; and the like.

Preparation of the emulsifying agents is effected by treating any of the polymers of pyridine derivatives containing at least one vinyl group, described above, with a water-soluble monobasic or dibasic organic acid containing from one to four carbon atoms, or a mineral acid. Examples of acids which are applicable include sulfuric, hydrochloric, nitric, phosphoric, formic, acetic, propionic, butyric, oxalic, malonic, succinic, glycolic, chloroaetic, dichloroacetic, and trichloroacetic acids. Generally the polymer is treated with acid sufficient to effect from 25 to 200 percent neutralization of the polymer and preferably sufficient acid is added to effect from 40 to 100 percent neutralization of the polymer.

Monomeric materials which can be polymerized using the emulsifying agents herein described include styrene, alpha-methylstyrene, various alkyl-substituted styrenes, acrylonitrile, methacrylonitrile, various acrylates such as methyl acrylate, ethyl acrylate, and methyl methacrylate, vinyl chloride, vinylidene chloride, various mixtures of these materials with each other, and conjugated diolefins with water-soluble monomers, such as 1,3-butadiene with acrylonitrile.

When carrying out polymerization reactions using the emulsifying agents of this invention the persulfate process can be used or the persulfate-bisulfite process more fully described hereinafter. Iron pyrophosphate processes, either sugar or sugar-free, such as employed in many low temperature polymerizations, are also applicable.

The amount of emulsifying agent employed is generally in the range from 0.5 to 20 parts per 100 parts of monomers by weight and depends upon the particular polymer used in its preparation, the amount of water employed, and the condition of the latex desired. The product obtained by direct polymerization, prior to any coagulation step, can vary from a dry crumb not dispersible in water to a fluid latex dispersible in water. The type of product is also governed by the monomeric materials polymerized. In general, with a particular polymerization system in which the amount of water is kept constant, an increase in the amount of emulsifying agent will cause an increase in the fluidity of the latex. In the preparation of polyacrylonitrile latex, for example, two parts of an emulsifier per 100 parts monomers by weight, such as that prepared from 2-methyl-5-vinylpyridine polymer 50 per cent neutralized with sulfuric or hydrochloric acid, is generally considered the minimum amount to use for a smooth latex if 300 parts of water per 100 parts monomers by weight are present in the system.

The amount of water employed is generally in the range from 100 to 600 parts per 100 parts of monomers with 150 to 400 parts being most frequently preferred.

The polymerization reactions of this invention are effected in an acid medium. The pH of the emulsifying agent is generally in the range between 1 and 6.

Polymerization temperatures are generally in the range between —40 and 70° C. When temperatures below the freezing point of the aqueous medium are employed, a suitable antifreeze agent is included in the system. Polymerization processes chosen are those which have been found most suitable for the temperature used.

The process of this invention has numerous advantages. The vinylpyridine polymer salts employed as emulsifying agents are non-ionic resinous materials when neutralized with a base. At the conclusion of a polymerization, a base is added to coagulate the polymer. The resins formed as the polymer coagulates are intermingled therewith to form an intimate mixture which is electrolyte-free. Such electrolyte-free polymer compositions are suitable for application where electrical resistance is an important factor. The method of this invention affords a direct means for obtaining blends of vinylpyridine polymers with other polymers. No diluent is necessary as is frequently the case when preparing blends of separately prepared polymers. The ratio of polymers in the blends is easily controlled by controlling the amount of emulsifier used for the polymerization reaction.

In addition to the above-mentioned advantages, certain specific advantages are noted when preparing acrylonitrile polymers. Smooth polyacrylonitrile latices are readily obtained by this method but with other emulsifying agents it is difficult, if not impossible, to obtain fluid latices. Polyacrylonitrile is employed in the manufacture of fibers but this material will not take dye readily. A fiber which will take dye is obtained if a small amount of vinylpyridine polymer is present. The intimate polymer mixtures obtained when operating according to the process of this invention are particularly important in fiber manufacture.

In order to disclose my invention in the fullest possible manner the following specific examples are given below:

*Example I*

Polymers of 2-vinyl- and 2-methyl-5-vinylpyridine were prepared according to the following process:

| | Parts by weight |
|---|---|
| Monomer | 100 |
| Water | 180 |
| Soap flakes | 5 |
| Mercaptan blend [1] | 0.3 |
| Potassium persulfate | 0.3 |
| Temperature | 50° C. (122° F.) |
| Conversion, percent | 90–100 |
| Time, hours | 20 |

[1] The mercaptan blend mentioned above is a mixture of $C_{12}$, $C_{14}$ and $C_{16}$ aliphatic mercaptans in the ratio of 3 : 1 : 1 parts by weight.

The latex was coagulated by adding sufficient sulfuric acid to give a viscous aqueous solution of polymer and then adding base to coagulate the resin. Sufficient base was added to convert the fatty acid to soap which was removed by several washings. The resin was then dissolved in isopyropyl alcohol and reprecipitated with water to insure complete removal of the soap.

The following process was employed for the polymerization of styrene at 50° C.: Styrene, 100 parts; water, 180 parts; poly-2-vinylpyridine, variable; $H_2SO_4$ for 50 per cent neutralization, variable; $K_2S_2O_8$, 0.9 parts; $NaHSO_3$, 0.52 parts; mercaptan blend (as above), 0.3 parts. (The parts are by weight.) The following results were obtained:

| Emulsifier, Parts | $H_2SO_4$, Parts | Conversion, Percent 16 Hours | Condition of Latex |
|---|---|---|---|
| 5 | 1.17 | 97.0 | Fluid. |
| 2.5 | 0.59 | 35.4 | Viscous. |
| 1 | 0.23 | 20.4 | Paste. |
| 0.5 | 0.12 | 31.4 | Paste. |

*Example II*

In order to show comparative results by the use of different emulsifying agents, four different runs were made using acrylonitrile as the monomer. The formulation was as follows (parts per 100 parts monomer): Acrylonitrile, 100; emulsifier, 5.0; water, 200; $K_2S_2O_8$, 0.6; $NaHSO_3$, 0.27; mercaptan blend, 0.25; pH, 4.5; temperature, 50° C. The following results were obtained:

| Emulsifier | Conversion, Percent at— | | Condition of Latex |
| | 45 Min. | 4 Hours | |
|---|---|---|---|
| Poly-2-vinylpyridine ½ neutralized with $H_2SO_4$. | 100 | | Smooth paste. |
| Santomerse #1 (purified) (alkyl aryl sulfonate). | 0 | 5.0 | Some precoagulum. |
| Maprofix MM (sodium lauryl sulfate). | | | All precoagulum, could not be sampled. |
| Triton X-100 (alkylated aryl polyether alcohol). | | | Do. |

Very stable, fluid latices were also obtained using the hydrochloride of 2-vinylpyridine polymer as the emulsifier at a water level of 300 parts per 100 parts of monomer.

*Example III*

Polyacrylonitrile and acrylonitrile-butadiene copolymers were prepared at 50° C. using poly-2-vinylpyridinium acetate as the emulsifier. The formulation was as follows (parts per 100 parts monomers): monomers, 100; water, 180; K₂S₂O₈, 0.6; NaHSO₃, 0.27; mercaptan blend, 0.25; poly-2-vinylpyridine, 5.0; acetic acid for ½ neutralization of poly-2-vinylpyridine, 1.43. The results were as follows:

| Acrylonitrile Parts | Butadiene, Parts | Conversion, Percent at — | |
|---|---|---|---|
| | | 3 hours | 18 hours |
| 100 | 0 | 100 | |
| 70 | 30 | 40.3 | 88.0 |
| 30 | 70 | 35.8 | 67.0 |

*Example IV*

Polymers of vinyl chloride and copolymers of vinyl chloride with acrylonitrile were prepared in the following persulfate-bisulfite process at 40° C. (parts per 100 parts monomers): monomers, 100; water, 300; K₂S₂O₈, 0.9; NaHSO₃, 0.52; poly-2-vinylpyridine, 5.0; HCl for 85 percent neutralization of poly-2-vinylpyridine, 1.45. The following results were obtained:

| Monomers | Conversion, Percent at— | | | Condition of Latex |
|---|---|---|---|---|
| | 1.4 Hours | 5 Hours | 18 Hours | |
| Vinyl chloride | | | 90.0 | Smooth paste. |
| 50/50 vinyl chloride-acrylonitrile | 44.7 | 78.5 | 86.3 | Fluid. |

It will be evident to one skilled in the art that further embodiments of this invention will be possible and the invention is not limited to the examples and statements given.

I claim:

1. In a process for emulsion polymerization of ethylenically unsaturated polymerizable organic compounds capable of forming high molecular weight linear polymers in an acid medium; the improvement of adding at least 0.5 part by weight per 100 parts of said polymerizable compounds of a salt of a polymer of a pyridine derivative of the formula

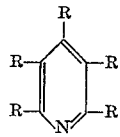

where R is selected from the group consisting of hydrogen, alkyl, vinyl, and alpha-methylvinyl groups; at least one and not more than two of said groups being vinyl or alpha-methylvinyl; and the total number of carbon atoms in the alkyl groups being not greater than 12, to the mixture as an emulsifying agent; adding a sufficient amount of a base to coagulate the polymer and to precipitate the polymer of the pyridine derivative, and recovering the resultant product, said product being a homogeneous blend of the two polymeric materials.

2. The process of claim 1 in which 0.5 to 20 parts by weight of said salt per 100 parts of monomer being polymerized are used.

3. The process of claim 1 in which the polymerization is conducted at a temperature between —40° to 70° C.

4. The process of claim 1 in which the components are present in the following amounts (based on 100 parts of the monomer):

Pyridine derivative polymer _____ 0.5 to 20
Water _____ 100 to 600 while employing a temperature of from —40 to 70° C. and a pH of from 1 to 6.

5. A process for polymerizing styrene in an acid medium consisting of mixing

| | Parts |
|---|---|
| Styrene | 100 |
| Water | 180 |
| Poly-2-vinylpyridine | 5 |
| H₂SO₄ for 50 percent neutralization | 1.17 |
| K₂S₂O₈ | 0.9 |
| NaHSO₄ | 0.52 |
| Blend of C₁₂, C₁₄ and C₁₆ aliphatic mercaptans in the ratio of 3:1:1 by weight | 0.3 | heating at 50° C.; adding sufficient base to coagulate the styrene polymer and to precipitate the poly-2-vinylpyridine; and recovering the resultant product.

6. A process for polymerizing acrylonitrile and butadiene using poly-2-vinylpyridinium acetate as an emulsifier comprising mixing 30 to 100 parts acrylonitrile, 70 to 0 parts butadiene; and (parts per 100 parts monomers) water, 180; K₂S₂O₈, 0.6; NaHSO₃, 0.27; mercaptan blend, 0.25; acetic acid for ½ neutralization of poly-2-vinylpyridine, 1.43; heating to convert the monomers to the copolymeric form; adding sufficient base to coagulate the copolymer and to precipitate the poly-2-vinylpyridine; and recovering the resultant product.

7. A latex composition comprising a dispersion in water of a high molecular weight polymerized organic compound and, as an emulsifying agent therefor and a constituent thereof, a salt of a polymer of a pyridine derivative of the formula

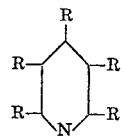

where R is selected from the group consisting of hydrogen, alkyl, vinyl, and alpha-methylvinyl groups; at least one and not more than two of said groups being vinyl or alpha-methylvinyl; and the total number of carbon atoms in the alkyl groups being not greater than 12, said salt being present in an amount of at least 0.5 parts by weight per 100 parts of said polymerized organic compound.

8. A latex according to claim 7 in which said polymerized organic compound is an acrylonitrile polymer.

9. A latex according to claim 7 in which said polymer of said pyridine derivative is a polymer of 2-methyl-5-vinylpyridine.

References Cited in the file of this patent

UNITED STATES PATENTS

| 2,487,829 | Richards | Nov. 15, 1949 |
| 2,527,863 | Webb | Oct. 31, 1950 |
| 2,548,318 | Norris | Apr. 10, 1951 |